United States Patent
Liao

(10) Patent No.: US 12,207,181 B2
(45) Date of Patent: Jan. 21, 2025

(54) ACCESS POINT IN MESH NETWORK FOR INITIATING DYNAMIC FREQUENCY SELECTION FLOW AND METHODS OF OPERATING THE SAME

(71) Applicant: Realtek Semiconductor Corp., HsinChu (TW)

(72) Inventor: Chien-Hung Liao, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 386 days.

(21) Appl. No.: 17/834,866

(22) Filed: Jun. 7, 2022

(65) Prior Publication Data

US 2023/0164675 A1 May 25, 2023

(30) Foreign Application Priority Data

Nov. 23, 2021 (TW) .................................. 110143448

(51) Int. Cl.
| | |
|---|---|
| *H04W 48/16* | (2009.01) |
| *H04W 4/06* | (2009.01) |
| *H04W 48/18* | (2009.01) |
| *H04W 84/18* | (2009.01) |
| *H04W 88/08* | (2009.01) |

(52) U.S. Cl.
CPC ............. *H04W 48/16* (2013.01); *H04W 4/06* (2013.01); *H04W 48/18* (2013.01); *H04W 84/18* (2013.01); *H04W 88/08* (2013.01)

(58) Field of Classification Search
CPC ....... H04W 4/06; H04W 48/14; H04W 84/12; H04W 48/18; H04W 48/12; H04W 48/16; H04W 4/80
See application file for complete search history.

(56) References Cited

U.S. PATENT DOCUMENTS

| | | | |
|---|---|---|---|
| 11,553,522 B1* | 1/2023 | Shukla | H04W 74/002 |
| 11,706,706 B1* | 7/2023 | Shukla | H04W 24/02 |
| | | | 370/328 |
| 11,871,237 B1* | 1/2024 | Han | H04W 92/10 |
| 2017/0026845 A1* | 1/2017 | Garg | H04W 16/10 |
| 2018/0213460 A1 | 7/2018 | Adella | |
| 2018/0278625 A1* | 9/2018 | Cammarota | H04L 9/3268 |
| 2021/0274500 A1 | 9/2021 | Cariou | |
| 2021/0409923 A1* | 12/2021 | Kumar | H04L 12/4633 |
| 2022/0070990 A1* | 3/2022 | George | H04W 4/33 |
| 2022/0279323 A1* | 9/2022 | Lee | H04L 12/2803 |
| 2022/0330136 A1* | 10/2022 | Siraj | H04W 48/12 |
| 2023/0080739 A1* | 3/2023 | Taskin | H04W 24/10 |
| | | | 370/252 |

(Continued)

*Primary Examiner* — Syed Ali
(74) *Attorney, Agent, or Firm* — Winston Hsu

(57) ABSTRACT

A first access point in a mesh network includes a transceiver and a processor. The processor is coupled to the transceiver, and is used to determine whether a second access point transmitting a beacon belongs to the mesh network upon detecting the beacon. If so, the processor is used to determine whether the beacon includes first channel switch announcement information, and if so, configure the transceiver to transmit second channel switch announcement information, and configure the first access point to switch to a target channel. The first channel switch announcement information and the second channel switch announcement information include information of the target channel.

7 Claims, 4 Drawing Sheets

(56) References Cited

U.S. PATENT DOCUMENTS

| | | | | |
|---|---|---|---|---|
| 2023/0090938 A1* | 3/2023 | Jones | ...................... | H04L 67/02 |
| | | | | 709/224 |
| 2023/0119650 A1* | 4/2023 | Zhou | ..................... | H04W 24/02 |
| | | | | 370/329 |
| 2023/0239673 A1* | 7/2023 | Dees | ..................... | H04W 8/005 |
| | | | | 370/329 |

* cited by examiner

ACCESS POINT IN MESH NETWORK FOR INITIATING DYNAMIC FREQUENCY SELECTION FLOW AND METHODS OF OPERATING THE SAME

BACKGROUND OF THE INVENTION

1. Field of the Invention

The invention relates to a mesh network, and in particular, to an access point in a mesh network for initiating a dynamic frequency selection flow and methods of operating the same.

2. Description of the Prior Art

A multiple access point (Multi-AP) network, also known as a mesh network, is a network architecture proposed by WiFi Alliance, being suitable for providing connections between multiple access points/routers in a large space to expand coverage of wireless network signals.

The regulation specifies that an access point in a mesh network needs to execute a dynamic frequency selection (DFS) flow when a DFS channel is adopted in the mesh network. The DFS channel is a channel for transmitting radar signals. In the DFS flow, if the access point in the wireless network uses the DFS channel as the operation channel, upon the access point detecting a radar signal, the access point needs to switch its operation channel to another channel, and is forbidden to return to the original DFS channel in a time interval as specified by the regulation.

The mesh network includes multi-AP controllers and multi-AP agents. If only one multi-AP agent detects a radar signal, only the multi-AP agent will execute the DFS flow for switching channels. The multi-AP controller will continue to run on the original DFS channel, resulting in a disconnection of a link between the multi-AP controller and the multi-AP agent, stopping the multi-AP agent from providing WiFi services, leading to poor user experience around the multi-AP agent.

SUMMARY OF THE INVENTION

According to an embodiment of the invention, a first access point in a mesh network includes a transceiver and a processor. The processor is coupled to the transceiver, and is used to determine whether a second access point transmitting a beacon belongs to the mesh network upon detecting the beacon; if the second access point belongs to the mesh network, determine whether the beacon includes first channel switch announcement information; and if the beacon includes the first channel switch announcement information, configure the transceiver to transmit second channel switch announcement information, and switch the first access point to a target channel. The first channel switch announcement information and the second channel switch announcement information comprise information of the target channel.

According to another embodiment of the invention, a method of operating a first access point in a mesh network includes after detecting a beacon, a processor of the first access point determining whether a second access point transmitting the beacon belongs to the mesh network, if the second access point belongs to the mesh network, the processor determining whether the beacon includes first channel switch announcement information, and if the beacon includes the first channel switch announcement information, a transceiver of the first access point transmitting second channel switch announcement information, and switching the first access point to a target channel. The first channel switch announcement information and the second channel switch announcement information comprise information of the target channel.

According to another embodiment of the invention, a method of operating an access point in a mesh network includes receiving a 1905 packet, and if the 1905 packet includes information of a target channel, a transceiver of the access point transmitting channel switch announcement information comprising the information of the target channel, and switching the access point to the target channel.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
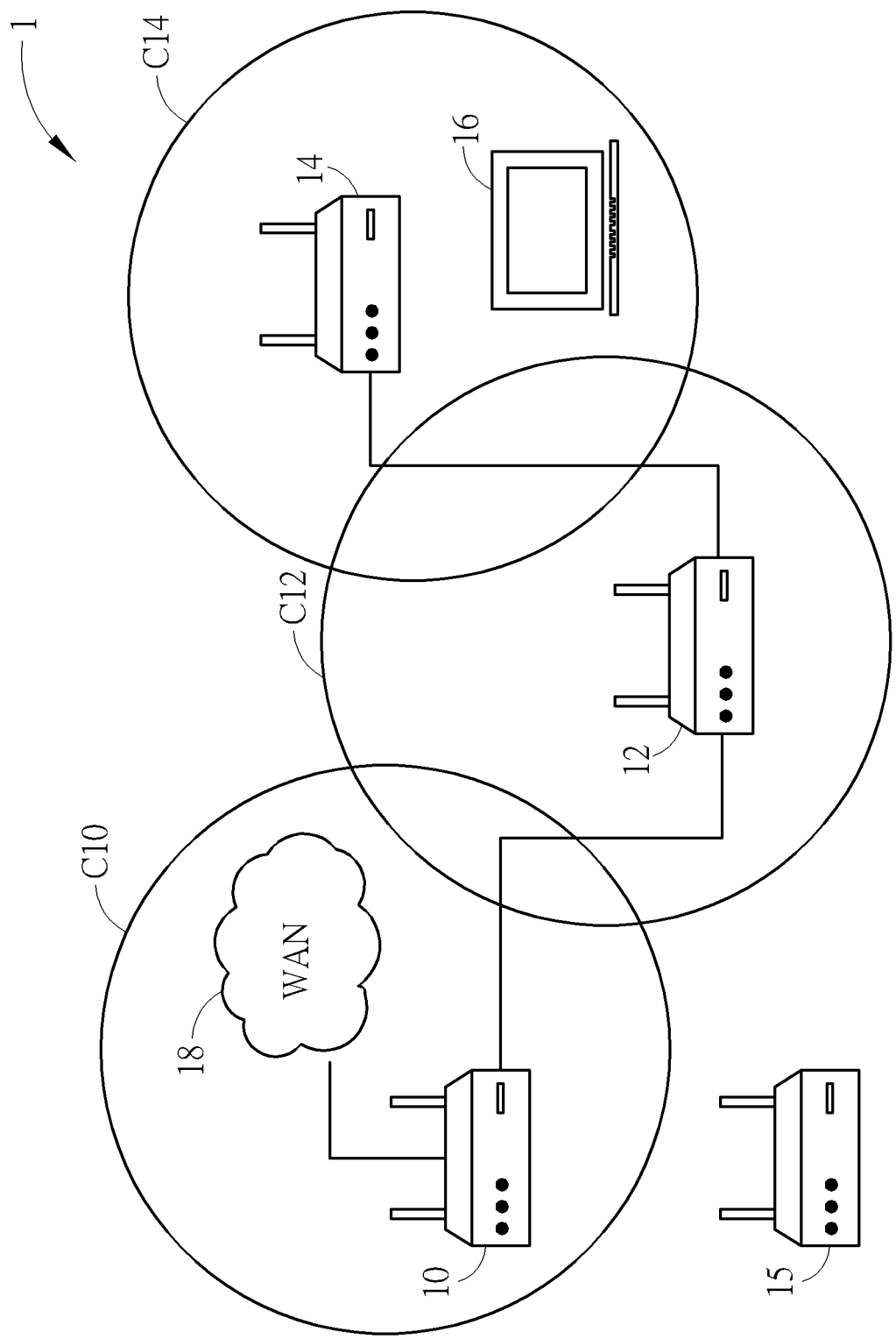
FIG. 1 is a schematic diagram of a mesh network according to an embodiment of the invention.

FIG. 1 is a schematic diagram of a mesh network 1 according to an embodiment of the invention. The mesh network 1 may be a wireless mesh network including a multi-access point (multi-AP) controller and one or more multi-AP agents. The mesh network 1 may adopt multi-AP specification version 2.0, IEEE 1905.1 protocol, and IEEE 802.11 protocol, where IEEE 802.11 specifies the communication protocols of the physical layer and the data link layer, and IEEE 1905.1 specifies the communication protocol of the convergence layer above the data link layer. The access points in the mesh network 1 may communicate with each other using 1905 packets. In FIG. 1, the mesh network 1 includes access points 10 to 14. The access point 10 may be configured as a multi-AP controller, and the access points 12 and 14 may be configured as multi-AP agents. The multi-AP controller may control the mesh network 1. For example, the access point 10 may determine connection statuses of the access points 10 to 14, select an operation channel for the mesh network 1, and control channel switching. The multi-AP agents may execute instructions from the multi-AP controller. For example, the access points 12 and 14 may receive instructions from the access point 10 to obtain a selected channel. If the mesh network 1 employs a dynamic frequency selection (DFS) channel to provide WiFi services, when the access point 12 or 14 detects a radar signal, all the access points 10 to 14 in the mesh network 1 will execute the DFS flow to switch to the same target channel, maintaining connections between the access points 10 to 14 and continuously providing WiFi services.

The access points 10 to 14 may be sequentially coupled in a wireless manner. The access points 10 to 14 may be set up at different locations to provide coverages C10 to C14, respectively. For example, the access points 10 to 14 may be set up at the 1st to 3rd floors of a house, and provide WiFi services in the coverages C10 to C14, respectively. The access point 10 may be additionally coupled to a wide area network (WAN) 18. A wireless station 16 may be coupled to the access point 14 in a wireless manner. The access points 10 to 14 may provide WiFi services via the same channel. When the wireless station 16 moves, the WiFi service may be obtained from the access point 10, 12, or 14 via the same channel, and thus, the access points 10 to 14 may be regarded as a single wireless network with the coverages C10 to C14.

The access points 10 to 14 may have a single-frequency, dual-frequency, or multi-frequency transmission capabilities. The operation of the mesh network 1 is explained with the access points 10 to 14 having single-frequency transmission capability in the 5 GHz band. The DFS channels are located in the 5 GHz band. If a DFS channel is selected as the operation channel of the mesh network 1, the access points 10 to 14 may listen for a radar signal in the operation channel in a first predetermined period such as 1 minute. If no radar signal is detected in the first predetermined period, the access points 10 to 14 may start to use the selected channel to provide WiFi services. For example, channels 56 to 144 in the 5 GHz band may be the DFS channels, the access point 10 may select a DFS channel 56 from the 5 GHz channels, and notify the access points 12 and 14 to use the DFS channel 56 to provide WiFi services. The access points 10 to 14 may listen for a radar signal in the DFS channel 56 for 1 minute, and if no radar signal is detected, start to use DFS channel 56 to provide WiFi services. Later, if one of the access points 10 to 14 detects that a radar signal is in the DFS channel, the access point that detects the radar signal may switch the channel. If the access point of detecting the radar signal is the access point 10, the access point 10 may transmit channel switch announcement (CSA) information to initiate a DFS flow, and the mesh network 1 will switch from the current DFS channel to another channel in a second predetermined period, e.g., in 500 microseconds, and the original DFS channel is forbidden for use in a third predetermined period, e.g., in 30 minutes. The CSA information may be transmitted via a beacon. If the access point 12 or 14 detects the radar signal, the access point 12 or 14 may issue a beacon including the CSA information and/or a 1905 packet including information of a target channel, so as to notify the access point 10 to initiate the DFS flow, as detailed in the operation method 300 in FIG. 3. Correspondingly, the access point 10 may initiate the DFS flow as detailed in the operation method 400 in FIG. 4 upon confirming that the beacon including the CSA information and/or the 1905 packet including the information of the target channel is transmitted from the access point 12 or 14 in the mesh network 1. The operation methods 300 and 400 will be described in detail in subsequent paragraphs.

The access point 10 may use a media access control (MAC) address or other network identification information to determine whether the beacon and/or 1905 packet is originated from the access point 12 or 14 belonging to the mesh network 1. For example, the access point 15 may be located near the access point 10 and does not belong to the mesh network 1. The access point 15 will not communicate with the access points 10 to 14 in the mesh network 1 using the 1905 packets, but the access points 10 to 14 may receive beacons from the access point 15. Upon establishing the mesh network 1, the access point 10 may store MAC addresses of the access points 12 and 14. Since a beacons transmitted by one of the access points 12 to 15 will contain the MAC address thereof, the access point 10 may compare the MAC address in the beacon to the MAC addresses stored in the access point 10 to determine whether the beacon is transmitted by an access point in the mesh network 1. When the MAC address in the beacon matches a MAC address stored in the access point 10, the access point 10 may determine that the beacon is transmitted from the access point 12 or 14 in the mesh network 1. When the MAC address in the beacon does not match a MAC address stored in the access point 10, the access point 10 may determine that the beacon is transmitted from the access point 15 outside the mesh network 1.

In some embodiments, the access point 10 does not need to store the MAC addresses of the access points 12 and 14, instead, a beacon transmitted by the access points 12 and 14 may carry network identification information, and the access point 10 may use the network identification information in the beacon to determine whether the beacon is transmitted from a access point in the mesh network 1. For example, the network identification information may be equipment vendor information. When equipment vendor information in the beacon matches the equipment vendor information of the access point 10, the access point 10 may determine that the beacon is transmitted from the access point 12 or 14 in the mesh network 1. When equipment vendor information in the beacon does not match the equipment vendor information of the access point 10, the access point 10 may determine that the beacon is transmitted from the access point 15 outside the mesh network 1. In another example, the network identification information may be a service set identifier (SSID) of the mesh network 1. When a SSID in the beacon matches the SSID of the access point 10, the access point 10 may determine that the beacon is transmitted from the access point 12 or 14 in the mesh network 1. When a SSID in the beacon does not match the SSID of the access point 10, the access point 10 may determine that the beacon is transmitted from the access point 15 outside the mesh network 1. In some embodiments, the 1905 packet may include a vendor specific message, which may include the information of the target channel, a MAC address of the access point transmitting the 1905 packet, or other DFS information. The access point 10 may determine that the 1905 packet is transmitted from the access point 12 or 14 in the mesh network 1 according to the MAC address or other DFS information in the 1905 packet.

Figure 2:
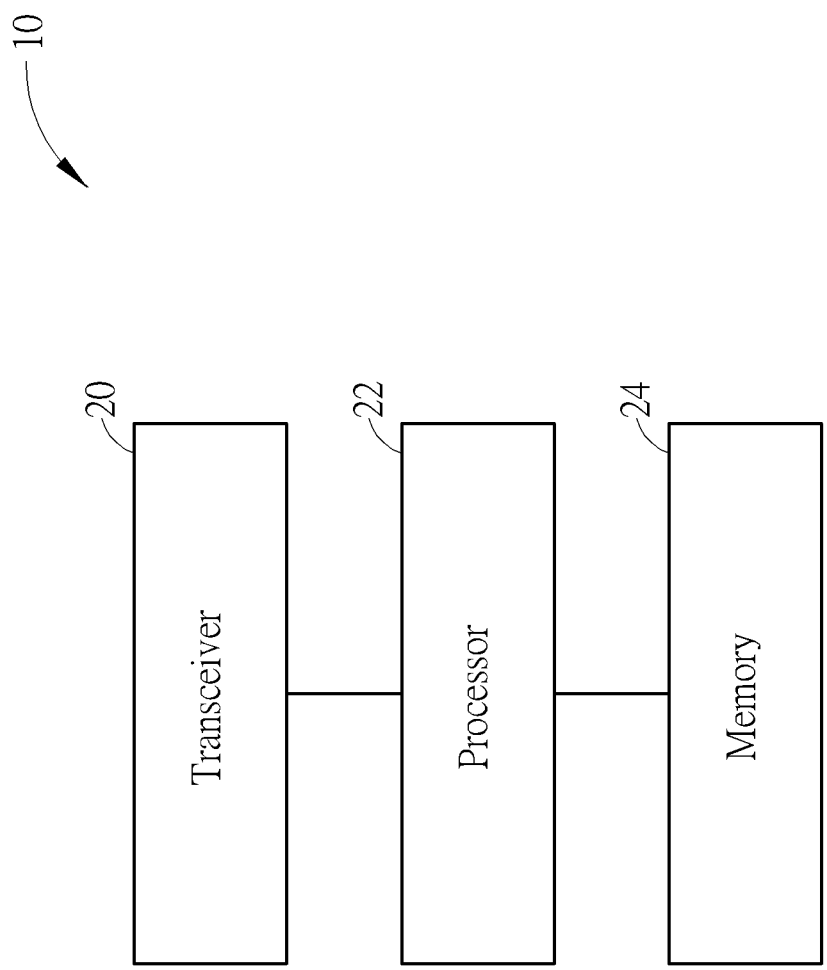
FIG. 2 is a block diagram of an access point according to an embodiment of the invention.

FIG. 2 is a block diagram of the access point 10, 12, or 14 in FIG. 1, with the access point 10 being used as an example. The access point 10 includes a transceiver 20, a processor 22, and a memory 24. The processor 22 is coupled to the transceiver 20 and the memory 24. While FIG. 2 only shows one set of transceiver 20, those familiar with the art will recognize that for dual-band or multi-band access points 10, 12, or 14, access points 10, 12, or 14 may include 2 or more sets of transceivers for transmitting and receiving 2 or more WiFi signals simultaneously.

Figure 3:
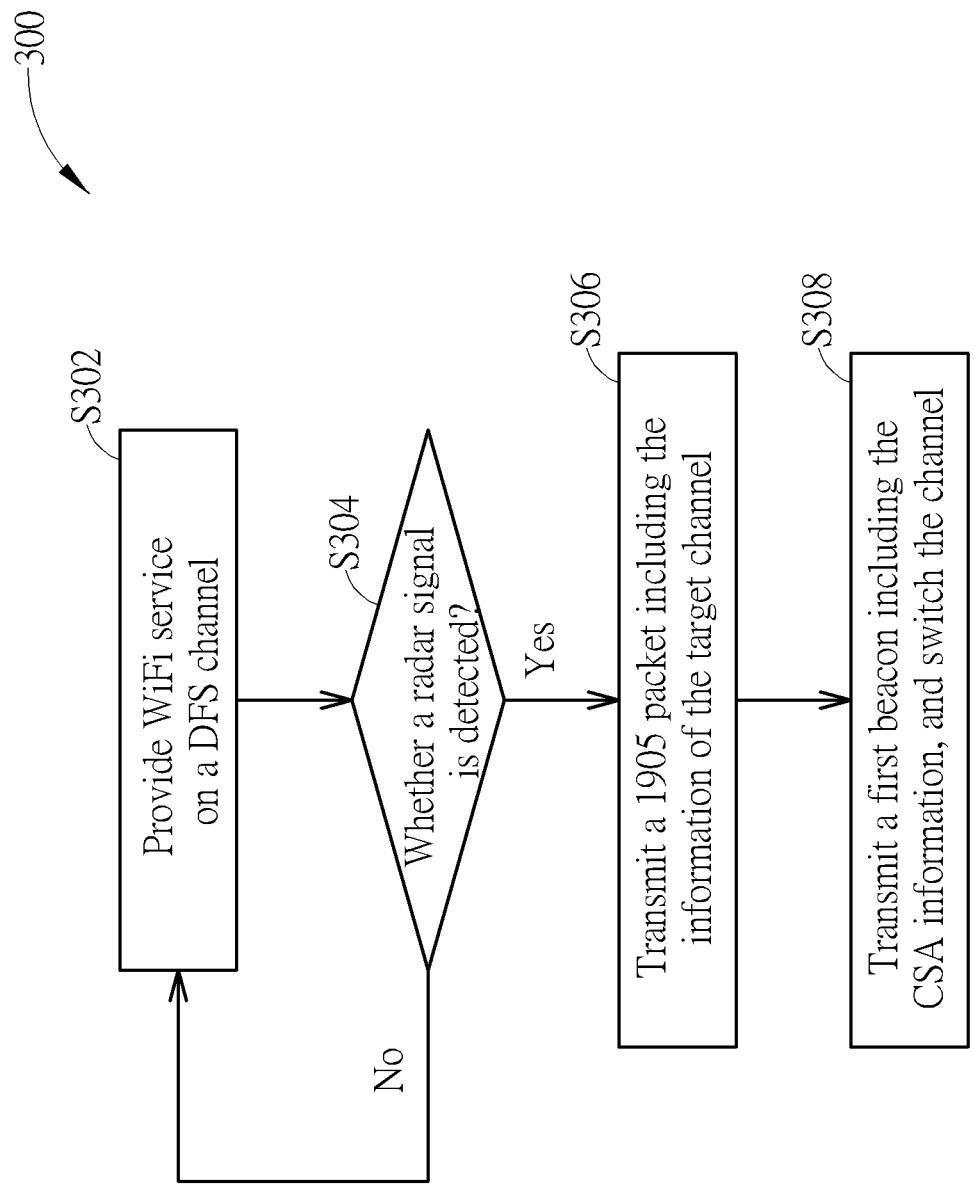
FIG. 3 is a flowchart of an operation method of operating the access point in FIG. 1 according to an embodiment of the invention.

FIG. 3 is a flowchart of the operation method 300 for use in the access point 12 or 14. The operation method 300 includes Steps S302 to S308 for use to trigger the DFS flow and transmit a 1905 packet and a first beacon upon detection of a radar signal. Any reasonable step change or adjustment is within the scope of the disclosure. Steps S302 to S308 are detailed as follows:

Step S302: Provide WiFi service on a DFS channel;
Step S304: Determine whether a radar signal is detected? If so, proceed to Step S306; if not, return to Step S302;
Step S306: Transmit a 1905 packet including the information of the target channel;
Step S308: Transmit a first beacon including the CSA information, and switch the channel.

In Step S302, the access point 12 or 14 provides WiFi services on the DFS channel while continuously monitoring the radar signal. In Step S304, if the processor 22 of the access point 12 or 14 determines that a radar signal is detected in the DFS channel, the access point 12 or 14 will notify the access point 10 of the detection (Steps S306 and S308). If the processor 22 of the access point 12 or 14 determines that no radar signal is detected in the DFS channel, the access point 12 or 14 will continue to provide WiFi services on the DFS channel (Step S302). In Step S306, the transceiver 20 of the access point 12 or 14 will transmit a 1905 packet including the information of the target channel. In Step S308, the transceiver 20 of the access point 12 or 14 will periodically transmit a first beacon including the CSA information at intervals of a fourth predetermined period, and the access point 12 or 14 will switch to the target channel after the second predetermined period. The target channel is selected by the processor 22. The CSA information in the first beacon includes the information of the target channel and a switching countdown. For example, the fourth predetermined period may be 100 microseconds, the transceiver 20 of the access point 12 or 14 may transmit the first beacon including the CSA information at intervals of 100 microseconds, and the first beacon transmitted at 500 microseconds after detecting the radar signal includes the information of the target channel and the switching countdown of 0. When the switching countdown reaches 0, the access points 10 to 14 will switch to the target channel.

While the operation method 300 adopts the 1905 packet and the first beacon to transmit the information of the target channel, in some embodiments, the operation method 300 may omit Step S306 and only adopt the first beacon to transmit the information of the target channel, for the access point 10 to trigger the DFS flow in a fast and reliable manner.

Figure 4:
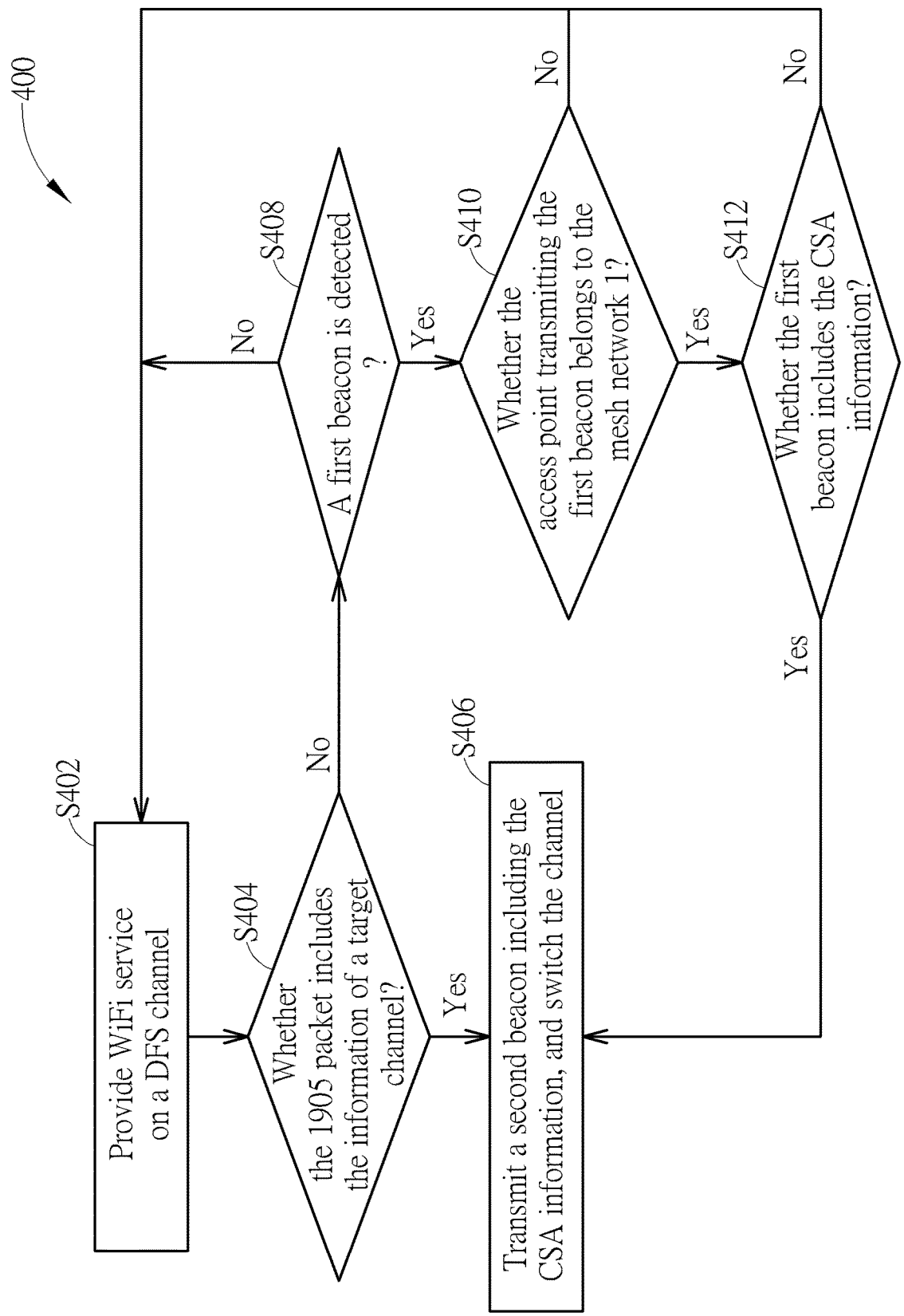
FIG. 4 is a flowchart of an operation method of operating the access point in FIG. 1 according to another embodiment of the invention.

FIG. 4 is a flowchart of the operation method 400 for use in the access point 10. The operation method 400 includes Steps S402 to S412 for use to trigger the DFS flow upon receiving the 1905 packet or the first beacon. Any reasonable step change or adjustment is within the scope of the disclosure. Steps S402 to S412 are detailed as follows:

Step S402: Provide WiFi service on a DFS channel;
Step S404: Determine whether a 1905 packet includes the information of a target channel? If so, go to Step S406; and if not, go to Step S408;
Step S406: Transmit a second beacon including the CSA information, and switch the channel;
Step S408: Determine whether a first beacon is detected? If so, go to Step S410; and if not, go back to Step S402;
Step S410: Determine whether the access point transmitting the first beacon belongs to the mesh network 1? If so, go to Step S412; and if not, return to Step S402;
Step S412: Determine whether the first beacon includes the CSA information? If so, go to Step S406; and if not, go back to Step S402.

In Step S402, the access point 10 provides WiFi services on the DFS channel while continuously monitoring the radar signal. In Step S404, if the processor 22 of the access point 10 determines that a 1905 packet including the information of a target channel is detected, since only the access points 10 to 14 in the mesh network 1 can communicate using the 1905 packet, the processor 22 of the access point 10 may determine that the 1905 packet is transmitted from the access point 12 or 14, and the transceiver 20 of the access point 10 will transmit a second beacon including the CSA information, and switch the access point 10 to the target channel after the second predetermined period (Step S406). The CSA information in the second beacon includes the information of the target channel and the switching countdown. When the switching countdown reaches 0, the access point 10 switches to the target channel.

If the processor 22 of the access point 10 determines in Step S404 that no 1905 packet including the information of a target channel is received, the processor 22 of the access point 10 will continue to determine whether the first beacon is detected (Step S408). If no first beacon is detected, the access point 10 does not need to switch the channel, and therefore, the access point 10 returns to Step S402 to continue to provide WiFi services on the DFS channel. If the first beacon is detected, the processor 22 of the access point 10 determines whether the access point transmitting the first beacon belongs to the mesh network 1 (Step S410). The memory 26 of the access point 10 may store the MAC addresses of the access points 12 and 14 upon establishment of the mesh network 1. The processor 22 of the access point 10 determines whether the beacon mesh network access point 1 by comparing the MAC address 26 of the first beacon to a MAC address in the first memory. In some embodiments, the access point 10 of the processor 22 may determine whether the beacon mesh network access point 1 by comparing the network identification information in the first beacon and the network identification information of the access point 10.

If the access point transmitting the first beacon belongs to the mesh network 1, the processor 22 of the access point 10 continues to determine whether the first beacon includes the CSA information (Step S412). If the access point that transmitting the first beacon does not belong to the mesh network 1, the access point 10 does not need to switch the channel, and returns to Step S402 to continue to provide WiFi services on the DFS channel.

If the first beacon includes the CSA information, the transceiver 20 of the access point 10 transmits a second beacon including the CSA information, and the access point 10 is switched to the target channel after the second predetermined period (Step S406). If the first beacon does not include the CSA information, the access point 10 does not need to switch the channel, and the access point 10 returns to Step S402 to continue to provide WiFi services on the DFS channel.

While the operation method 400 uses 1905 packets and the first beacons to determine whether to initiate the DFS flow, in some embodiments, the operation method 400 may omit Step S404 and only use the first beacon to determine whether to initiate the DFS flow, for the access point 10 to trigger the DFS flow in a fast and reliable manner.

The embodiment in FIGS. 1 to 4 uses the 1905 packet and beacons of the mesh network 1 to determine whether to initiate the DFS flow. When the access point 12 or 14 detects a radar signal, all the access points 10 to 14 in the mesh network 1 will execute the DFS flow to switch to a common target channel, maintaining the connections between access points 10 to 14 and continuing to provide WiFi services.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A first access point in a mesh network, the first access point comprising:
  a transceiver; and a processor coupled to the transceiver, and configured to:
  upon detecting a beacon, if information of an equipment vendor in the beacon matches information of an equipment vendor of the first access point, determine that a second access point transmitting the beacon belongs to the mesh network;
  if the second access point belongs to the mesh network, determine whether the beacon includes first channel switch announcement information; and
  if the beacon includes the first channel switch announcement information and a first switching countdown of the first channel switch announcement information reaches zero, configure the transceiver to transmit second channel switch announcement information, and switch the first access point to a target channel, wherein the first channel switch announcement information and the second channel switch announcement information comprise information of the target channel, the first channel switch announcement information further comprises the first switching countdown, the second channel switch announcement information further comprises a second switching countdown, and the beacon is transmitted periodically according to a predefined period.

2. The first access point of claim 1, further comprising a memory configured to store a media access control address of another access point in the mesh network;
  wherein if a media access control address of the second access point in the beacon matches the media access control address of the another access point, the processor is configured to determine that the second access point belongs to the mesh network.

3. The first access point of claim 1, wherein:
  if a service set identifier in the beacon matches a service set identifier of the first access point, the processor is configured to determine that the second access point belongs to the mesh network.

4. A method of operating a first access point in a mesh network, the method comprising:
  transmitting a beacon periodically according to a predefined period by a second access point;
  upon detecting the beacon, if information of an equipment vendor in the beacon matches information of an equipment vendor of the first access point, a processor of the first access point determining whether the second access point belongs to the mesh network;
  if the second access point belongs to the mesh network, the processor determining whether the beacon includes first channel switch announcement information; and
  if the beacon includes the first channel switch announcement information and a first switching countdown of the first channel switch announcement information reaches zero, a transceiver of the first access point transmitting second channel switch announcement information, and switching the first access point to a target channel, wherein the first channel switch announcement information and the second channel switch announcement information comprise information of the target channel, the first channel switch announcement information further comprises the first switching countdown, and the second channel switch announcement information further comprises a second switching countdown.

5. The method of claim 4, further comprising:
  a memory of the first access point storing a media access control address of another access point in the mesh network;
  wherein the processor of the first access point determining whether the second access point transmitting the beacon belongs to the mesh network comprises: if a media access control address of the second access point in the beacon matches the media access control address of the another access point, the processor determining that the second access point belongs to the mesh network.

6. The method of claim 4, wherein the processor of the first access point determining whether the second access point transmitting the beacon belongs to the mesh network comprises:
  if a service set identifier in the beacon matches a service set identifier of the first access point, the processor determining that the second access point belongs to the mesh network.

7. The method of claim 4, further comprising:
  upon detecting a 1905 packet including the information of the target channel, the processor configuring the transceiver to transmit the second channel switch announcement information, and switching the first access point to the target channel when the second switching countdown reaches zero.

* * * * *